US006556287B1

(12) United States Patent
Dennis

(10) Patent No.: US 6,556,287 B1
(45) Date of Patent: Apr. 29, 2003

(54) SUBTERRANEAN COURSE ALIGNMENT LASER INSTRUMENT

(75) Inventor: Ronald W. Dennis, Springfield, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/520,044

(22) Filed: Mar. 7, 2000

(51) Int. Cl.[7] ............................. G01C 1/00; G01B 11/26
(52) U.S. Cl. ...................... 356/138; 356/153; 356/141.3
(58) Field of Search ............................. 356/138, 139.04, 356/139.1, 153, 141.3, 399, 139.03; 33/286, 285

(56) References Cited

U.S. PATENT DOCUMENTS

| 4,175,861 A | * | 11/1979 | Kottas ........................ 356/153 |
| 4,403,664 A | | 9/1983 | Sullinger |
| 4,647,252 A | | 3/1987 | Floy |
| 4,786,178 A | | 11/1988 | Teach |
| 5,186,579 A | | 2/1993 | Hanamoto et al. |
| 5,339,241 A | | 8/1994 | Fujimori et al. |
| 5,877,854 A | | 3/1999 | Shai et al. |
| 5,936,721 A | * | 8/1999 | Ohtomo et al. ............. 356/138 |

* cited by examiner

*Primary Examiner*—Zandra V. Smith
(74) *Attorney, Agent, or Firm*—Gerald B. Hollins; Thomas L. Kundert

(57) ABSTRACT

A subterranean course-defining laser instrument and a system for initial calibration or setup of this instrument to provide accurate definition of a sub surface course for a pipeline or the like. Instrument setup is made in response to an above-ground course definition marker such as a surveyor's stake or surveyor's rod. A double mirror pseudo periscope arrangement is used to enable optical signal communication from the subterranean location of the laser instrument to the above ground marker with each of the mirrors being of a curved and error-minimizing nature. Details regarding two major components of the apparatus and quantitative consideration of achieved error budget are included.

20 Claims, 2 Drawing Sheets

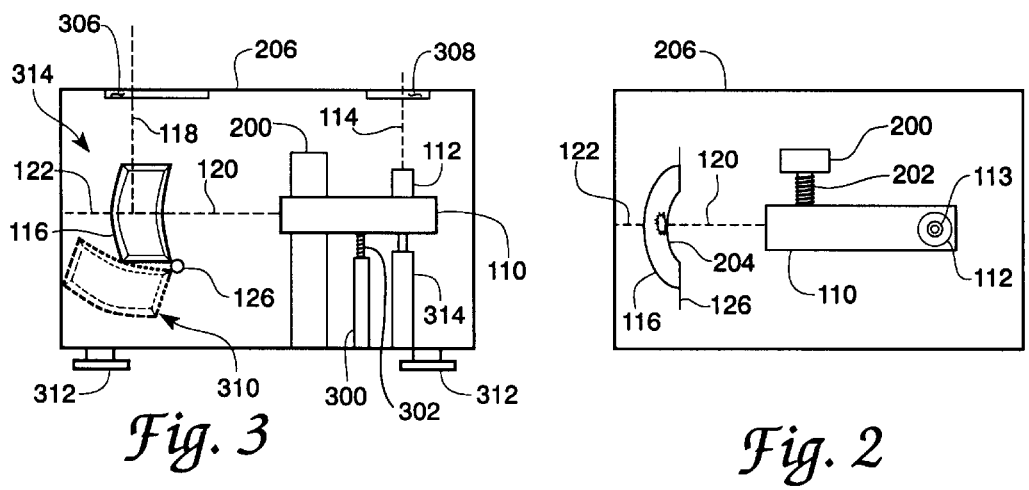
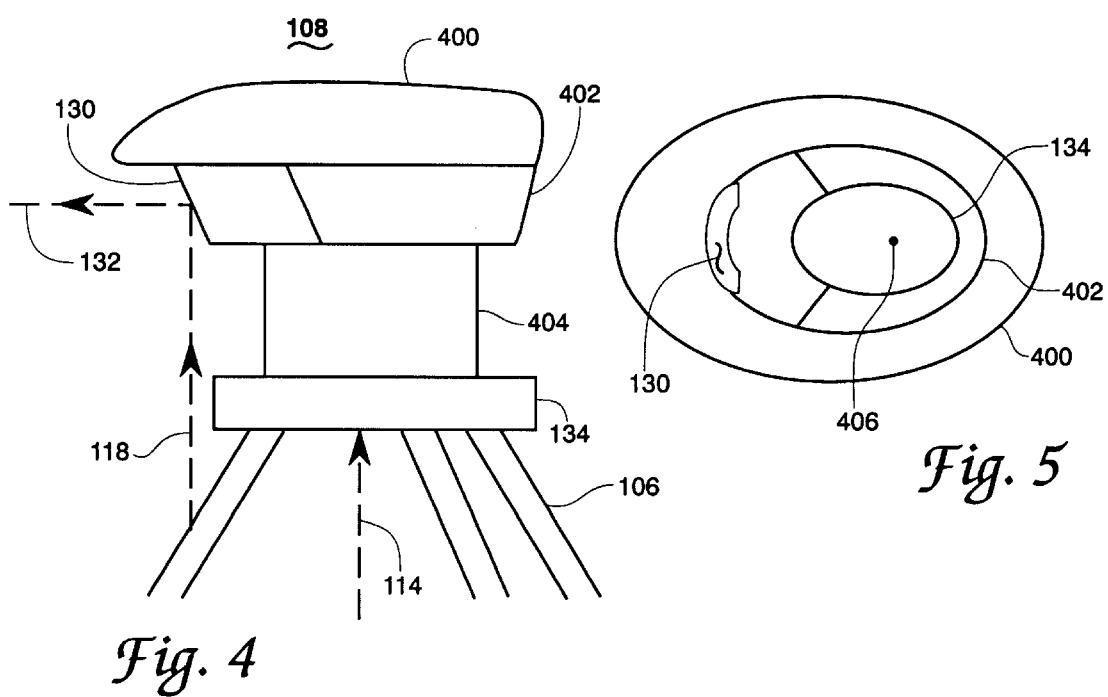

SUBTERRANEAN COURSE ALIGNMENT LASER INSTRUMENT

RIGHTS OF THE GOVERNMENT

The invention described herein may be manufactured and used by or for the Government of the United States for all governmental purposes without the payment of any royalty.

BACKGROUND OF THE INVENTION

This invention relates to the field of laser aided land surveying instruments and methods as applied to the precise azimuth disposition of a subterranean pipe/conduit/tunnel or similar object in the earth.

Laser inclusive instruments are often used to establish the azimuth and grade for man made surface objects such as roads and buildings. Under certain conditions such instruments are also usable for accurately laying pipe and conduit in the earth and for tunneling and other below grade construction tasks. With such instruments the azimuth alignment of a pipe/conduit/tunnel can be accurately controlled with minimized expenditure of measurement and earth movement assets. In the pipe/conduit/tunnel azimuth alignment instance these instruments generally consist of a visible spectrum energy-emitting laser physically oriented by instrument azimuth and pitch-determining elements and mounted in a housing appropriate for field use—use at the bottom of a hole or trench for example. In such instruments azimuth or azimuth and elevation pointing of the instrument may be achieved with steering optics that also expand and collimate the laser beam.

According to present-day typical practices, after disposing a subterranean course alignment instrument at the bottom of an appropriate hole in the earth or at the bottom of an initially commenced trench, the instrument is brought to designating the desired pipe/conduit/tunnel azimuth by locating a transit or similar device on the earth surface directly above the instrument and aiming the transit at a surveying reference, e.g. a stake in the ground or a positioned surveyor's rod, identifying the desired pipe/conduit/tunnel course. While maintaining the transit's azimuthal alignment, the transit telescope is then pointed downward into a hole in the earth or into a commenced trench, toward a wall surface. The laser alignment instrument beam is then aimed at the same wall surface and brought into the desired alignment with a point determined by using the transit telescope reticule.

Moreover according to current practice, the transit or similar device can alternatively be used to position an alignment target on the wall within the hole or commenced trench and then bringing the laser into the desired alignment with the target. Present day subterranean course alignment instruments typically include apparatus enabling remote control of the azimuth and elevation pointing of the laser beam upon command from an operator person. A single person, using such remote aim-point control of the instrument, can usually accomplish an initial setup of an instrument in 10 to 15 minutes after excavating the trench and placing the instrument at the bottom. Subsequent realignment requires a comparable length of time. Work site equipment movement and the associated vibration however often require the instrument to be realigned frequently. The thus-described conventional alignment technique therefore requires an extensive open trench in the earth; this requirement is often considered a safety concern for people and equipment. A faster alignment capability not requiring an open trench is therefore highly desirable. The present invention addresses this need.

SUMMARY OF THE INVENTION

The present invention provides an improved subterranean course alignment laser instrument and a system for rapid and convenient calibration or setup of this instrument to obtain accurate definition of a sub surface course for a pipe/conduit/tunnel or the like. Instrument setup is made in response to an above-ground course definition marker such as a surveyor's stake or surveyor's rod, without use of a surveyor's transit and while the instrument is disposed in a subterranean location. Optical elements selected in recognition of a limited error budget available in such equipment are added to the instrument to provide separate output beams for setup and for pipe/conduit/tunnel alignment uses.

It is an object of the present invention therefore to provide a subterranean course alignment instrument capable of convenient, fast and accurate setup.

It is another object of the invention to provide a subterranean course alignment instrument having single person setup capability.

It is another object of the invention to provide a subterranean course alignment instrument having desirable accuracy characteristics.

It is another object of the invention to provide a subterranean course alignment instrument capable of desirable accuracy operation under field use conditions.

It is another object of the invention to provide a subterranean course alignment instrument capable of operation within a desirably small error budget.

It is another object of the invention to provide a subterranean course alignment instrument having a two beam initial alignment procedure.

It is another object of the invention to provide a laser alignment instrument employing curved three dimensional optical elements in its initial alignment procedure.

It is another object of the invention to provide a subterranean course alignment instrument having above ground initial alignment input capability.

It is another object of the invention to provide a subterranean course alignment instrument having a pseudo periscope underground to above ground optical communication arrangement.

It is another object of the invention to provide a subterranean course alignment instrument in which complementary optical elements are used to reduce setup error characteristics.

It is another object of the invention to consider the error sources encountered in a concave beveled mirror and convex beveled mirror arrangement of a subterranean course alignment instrument.

These and other objects of the invention are achieved by a surface-referenced pipe/conduit/tunnel subterranean azimuth course-determining laser apparatus comprising the combination of:

a first laser element disposed in a subterranean receptacle and generating subterranean receptacle-contained horizontally directed radiant energy emission at an output port thereof;

a desired pipe/conduit/tunnel azimuth course marker element disposed at a surface reference location distal of said subterranean receptacle;

first curved mirror apparatus selectively coupled to said output port of said first laser element and selectively directing said subterranean receptacle-contained horizontally directed radiant energy emission upward and out of said subterranean receptacle;

second curved mirror apparatus disposed above said subterranean receptacle and said first laser element and orienting said upward and out-directed first laser element radiant energy parallel with said first laser element horizontally directed radiant energy emission away from said subterranean receptacle in an above ground selected azimuth direction toward said desired pipe/conduit/tunnel course marker element;

said subterranean receptacle-contained first laser element horizontally directed radiant energy emission selectively designating a desired subterranean azimuth course for said pipe/conduit/tunnel in response to prior optimized receipt of said first laser radiant energy at said desired pipe/conduit/tunnel course marker surface reference element via said first curved mirror apparatus and said second curved mirror apparatus.

BRIEF DESCRIPTION OF THE DRAWINGS

FIG. 2 shows a more detailed top view of a laser alignment instrument according to the present invention.

FIG. 3 shows a more detailed side view of a laser alignment instrument according to the present invention.

FIG. 4 shows a side view of a convex beveled mirror apparatus usable in the invention.

FIG. 5 shows a bottom view of a convex beveled mirror apparatus usable in the invention.

DETAILED DESCRIPTION

Figure 1:
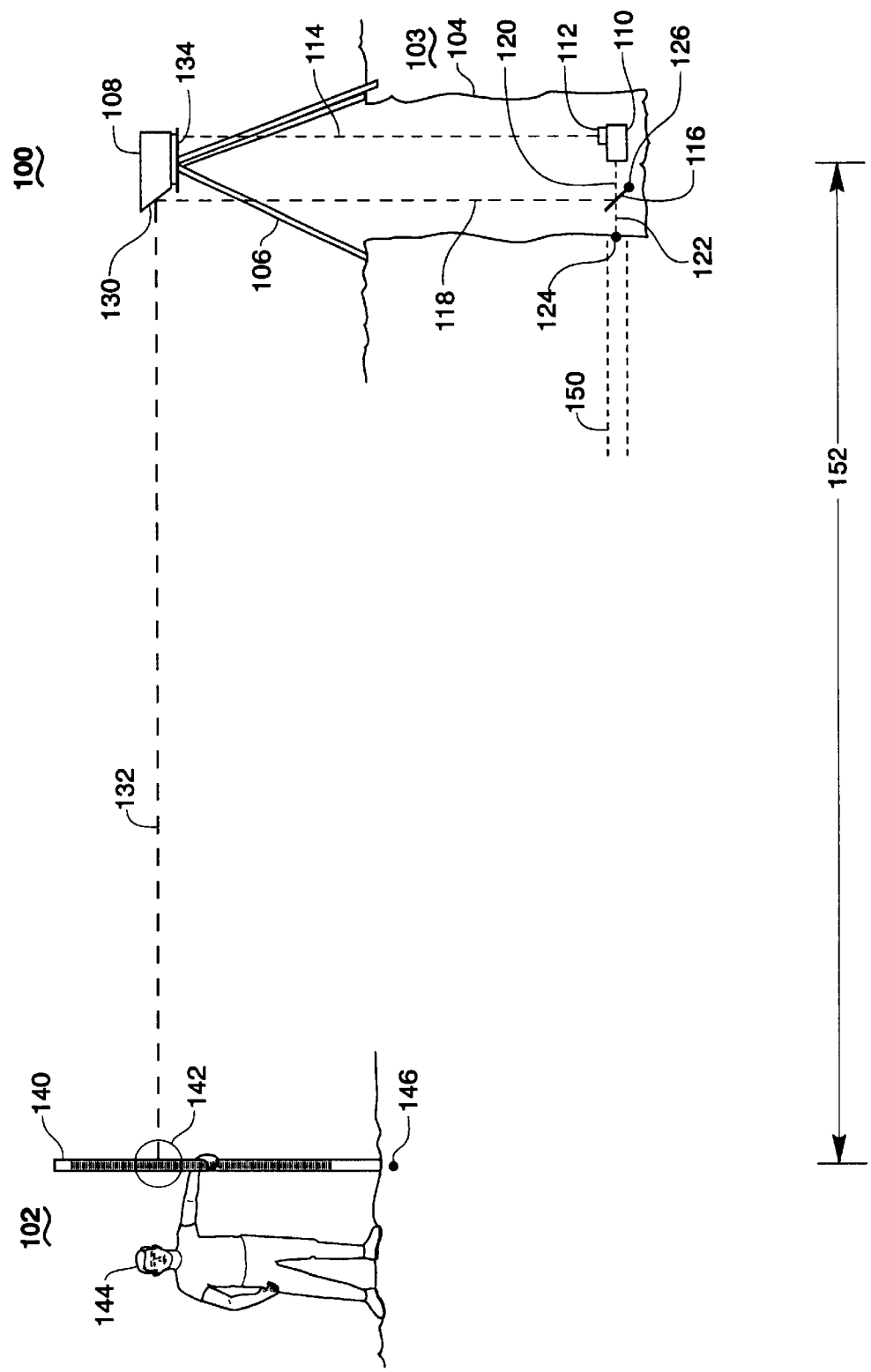
FIG. 1 shows laser alignment instrument according to the invention in an initial alignment and field use situation.

FIG. 1 in the drawings shows a simplified diagram of a subterranean course alignment instrument according to the present invention in both an in-the-field initial instrument alignment and in a subsequent instrument use condition. In the FIG. 1 drawing the subterranean course alignment instrument and associated above ground reflector apparatus 100 are shown in a course-determined or aligned condition with an above ground course determining marker 140 and its associated apparatus at 102. In the FIG. 1 drawing the subterranean course alignment instrument and associated apparatus at 100 can be observed to include a first laser member 110 disposed in a receptacle or hole 104 in the earth 103.

The output energy from the laser 110 flows along the horizontal path 120 in FIG. 1 to a movable, two position mirror element 116 mounted on a pivot member 126. In the mirror position shown in FIG. 1 the output energy of laser 110 is reflected upward along the path 118 by this mirror 116. In the alternate and downward rotated position of mirror 116 (as appears at 310 in FIG. 3) the laser 110 output energy along path 120 is allowed to continue along path 122 to a spot 124 located on a side of the receptacle 104. As will be better understood from subsequent discussion herein the path 122 and the spot 124 define the desired course of the path being arranged in the FIG. 1 drawing, i.e., the course indicated generally at 150 in FIG. 1. The course 150 may represent the path of a sewer line, a water line, an electro-optic conduit line, a petroleum product line, a ditch or a tunnel and other structures for examples.

In the FIG. 1 illustrated upward rotated position of mirror 116 the laser output energy from path 120 is reflected along path 118 to another mirror element 130 mounted on a tripod 106 or similar device received over the earth receptacle 104. The mirror element 130 is a part of a mirror assembly 108 carried on a tripod 106-mounted platform assembly 134. The mirror element 130 accomplishes a second corner turning function for the laser energy of paths 120 and 118 and directs this energy along the generally horizontal path 132 toward the course-determining marker apparatus 102.

Connected to the laser 110 in the FIG. 1 drawing is a second laser 112, a laser generally orthogonally disposed with respect to the laser 110 and its related paths 120 and 122. Output energy from this second laser 112 is directed along the upward path 114, a path which is also orthogonally disposed with respect to the laser 110 and the paths 120 and 122. The second laser 112 in the FIG. 1 apparatus provides an optical signal usable in achieving the desired vertically aligned dispositions of the reflecting surfaces of mirrors 116 and 130 during the instrument setup sequence described herein. To facilitate this alignment the mirror assembly 108 is preferably provided with an optical and semiconductor-based alignment mechanisim employing output of the second laser 112 to horizontally align the upper and lower elements 108 and 110 using a pair of horizontal servomechanisms in the mirror assembly 108. The second laser 112 may be of the semiconductor or solid state variety since its distance of operation is generally limited to the depth of the receptacle 104. The primary laser 110 may be of the semiconductor type or of the gaseous laser type if needed for greater energy output and spectral selection considerations.

The above ground course determining marker and its associated apparatus at 102 may be observed in the FIG. 1 drawing to include the elected pipe/conduit/tunnel terminal point marker 146 (a mark disposed on or in the earth surface), the surveyor's rod 140 received on this point 146 and the rod target 142 all of which may be attended by the person 144. The terminal point of marker 146 may of course be identified with use of a wooden stake, an earth-driven rod or other marking devices known in the art (which may be unattended) in substitution for the surveyor's rod 140. The distance between subterranean course alignment instrument and associated apparatus at 100 and the above ground course-determining marker and its associated apparatus at 102 is indicated at 152 in FIG. 1.

The possible length of this distance 152 in an instrument use situation may be limited for example by conditions such as terrain irregularities, interfering objects and atmospheric conditions. The above mentioned selection of laser wavelength and laser type, whether semiconductor or gaseous, and laser operating power level can influence these characteristics. The maximum length of this distance may also be influenced by a tendency of the laser energy beam to spread with increasing lengths of distance 152. Notwithstanding such spreading however it is often feasible to detect the center point of a Gaussian-spread laser beam energy distribution to a degree enabling satisfactory instrument alignment. Typical lengths of distance 152 in the heretofore used instrument alignment practice discussed above are fifty to five hundred feet, these distances are practical for the present invention instrument also.

Generally the above ground instrument setup alignment path 132 connecting the above ground reflector assembly 108 with the above ground course determining marker and its related apparatus at 102, and the subterranean laser energy paths 120–122, are parallel disposed. It is the above ground instrument setup alignment path 132 which is used by the FIG. 1 apparatus to define the desired alignment for the subterranean pipe/conduit/tunnel or other structure (hereinafter referred-to generically simply as a pipeline) paths 120–122 and 150. In other words during a setup cycle of the FIG. 1 apparatus the invention contemplates adjusting the physical position of laser 110 in the receptacle 104 causing the laser energy along path 132 to fall on the appropriate portion of the above ground course determining marker 140 and its associated apparatus at 102. With this instrument setup alignment accomplished, a pivotal position change of the mirror 116 causes the laser output energy on path 126 to continue along the path 122 and designate the point 124, i.e., the commencement point for the pipeline path 150. As the trenching or tunneling for the pipeline ensues from the receptacle 104 the laser energy point 124 of course moves to the left in the FIG. 1 drawing to fall on each new earthen receptacle sidewall as it is exposed. The moving point 124 therefore continuously designates the subterranean pipeline course and provides the desired trenching or tunneling azimuth guidance to assure the pipeline will pass below the point marker 146 and the marker 140.

FIG. 2 and FIG. 3 in the drawings shows additional details of the laser 110 and the mirror 116 appearing in FIG. 1. The FIG. 2 drawing represents a cutaway top view of a housing 206 for the laser 110 and the mirror 116 and shows refinements attending each of these elements not represented in the FIG. 1 drawing. FIG. 3 represents a cutaway side view of the housing 206 and shows details of yet additional attending refinements. Identification numbers used in the FIG. 1 drawing are repeated to the best degree possible in the FIG. 2 and FIG. 3 drawings and in the subsequent drawings herein. Of particular interest in the FIG. 2 and FIG. 3 drawings is the laser mounting or supporting structure providing a needed degree of yaw axis and elevation axis freedom for the laser 110. Generally this supporting structure includes the pivot-topped mounting pedestal 314, the elevation adjustment jack 300 and its extension screw 302 and the yaw angle-anchor member 200 together with its adjustment screw 202. (Both FIG. 2 and FIG. 3 merit consideration in reaching an appreciation of these elements and their function.)

The mirror 116 in FIG. 1 is shown, particularly in the FIG. 2 drawing, to be of a curved and three dimensional nature; this showing is in supplement or additional clarification of the simplified planar nature of mirror 116 represented in the FIG. 1 drawing. Additional detail of this mirror appears in the FIG. 3 drawing where one segment of the beveled or forty-five degree angle-disposed reflecting surface of the mirror becomes particularly visible again. As may be appreciated from the FIG. 2 and FIG. 3 views of mirror 116 this mirror may be described as having a "concave beveled surface" in its active portion. Preferably this "concave beveled surface" is covered by a front-side reflection coating which serves to reflect radiant energy from laser 110 to the oppositely curved or convex mirror, represented in simplified form, at 130 in FIG. 1.

The pivot 126 which was shown in FIG. 1 also appears in the FIG. 3 drawing. In FIG. 2 and FIG. 3 the mirror 116 is shown to be in an instrument setup position wherein laser output energy along path 120 is reflected to a right angle path 118 in order to travel in an upward direction out of the earthen receptacle 104 of FIG. 1 and ultimately illuminate the surveyor's rod 140. In an instrument use position of mirror 116, as shown at 310 in FIG. 3, this mirror 116 is removed from the laser energy path by way of mirror rotation about pivot 126 and then laser energy travels along the extension of path 120 represented at 122 in FIG. 1, FIG. 2 and FIG. 3. Appropriate "stops" to provide precise positioning of mirror 116 in each of its FIG. 3-illustrated positions 310 and 314 may be arranged according to mechanical techniques known in the art. The yaw axis pivot point at 113 in the FIG. 2 top view is shown in dotted form in response to the fact that the laser 112 covers the pivot point in this view.

In view of the subterranean course alignment instrument being intended for placement in an earth receptacle as shown at 104 in FIG. 1, it is convenient for the laser mounting elements in FIG. 2 and FIG. 3 of the drawings to be remotely controllable in order that positioning of the instrument, as needed to provide alignment with the surveyor's rod 140, can be accomplished from an above-ground and possibly receptacle-removed location. To this end the threaded screw members shown at 202 and 302 in FIG. 2 and FIG. 3 may be provided with electric motor or other remotely energizable driving members, motors disposed for example in the support members 200 and 300. In a somewhat related manner the FIG. 2 and FIG. 3 subterranean course alignment instrument is contemplated to include a self leveling apparatus, preferably of the servomechanism-operated and substantial accuracy type. Self leveling devices of this type are available as an off the shelf package in the commercial marketplace and may for example be obtained from The Fredericks Company of Huntingdon Valley, Pa. as part number 0717-2201 and from others. In the receptacle 104 or other in-the-field use locations the housing 206 may rest on the attached feet 312 which can be provided with coarse leveling capability in order to manually assist the above described self leveling apparatus.

Windows for transmission of the radiant energy from lasers 110 and 112 are provided at 306 and 308 in the FIG. 3 drawing. These windows may be made from glass or plastic or other suitable materials and are characterized by a need for spectral compatibility or having a reasonably efficient energy transmission window located at the wavelength of the relevant laser energy. These windows 306 and 308 are preferably arranged to be easily cleaned in view of their exposure to in-the-fIeld conditions. Protective cup-like shields may be used to surround each window 306 and 308 to exclude soil particles and other earth receptacle-related debris.

Laser radiant energy communicated along the path 118 in FIG. 1 is directed at the surface of the mirror 130 where it is reflected to communicate along the path 132 to for example the surveyors rod 140. The mirror 130 is also curved in configuration and in fact may be described as having a "convex beveled surface". The mirror 130 is disposed in a rain hat-inclusive assembly identified generally at 108 and this assembly is mounted on the tripod 106 by way of the platform apparatus 134. Located above the platform apparatus 134 is a second self leveling device of the type described above or a related type which serves to dispose the mirror 130 in vertical alignment with its input optical axis aligned with the output optical axis of the subterranean course alignment instrument concave mirror 116. This second leveling device is shown in enlarged form at 404 and discussed in connection with FIG. 4 below. The output energy communicating along the FIG. 1 path 114 from the second laser 112 provides an optical reference for two axis horizontal alignment of the mirror 130 with the optical axis of this subterranean course alignment instrument concave mirror 116 as indicated previously.

The concave and convex mirrors 116 and 130 in the FIG. 1 apparatus are used to provide a desirable maximum degree of alignment criticality freedom for the "pseudo periscope" formed by the mirrors 116 and 130. The nature and perhaps the extent of this alignment criticality freedom may be appreciated for example by considering the characteristics of the FIG. 1 apparatus obtained if the mirrors 116 and 130 were of a planar rather than the disclosed concave beveled surface and convex beveled surface types. With a planar mirror located at 116 for example it may be appreciated that angular misalignment between the laser 112 and the mirror 116, i.e., selection of a non perpendicular radius between the laser 112 and the laser-intercepted horizontal chord of a planar mirror at 116, would result in the laser beam path 118 being provided with an angular component tilting the path 118 into or out of the plane of the FIG. 1 drawing. Such tilting of the path 118 is however largely absent when the mirror is configured as the disclosed concave beveled surface. A similar advantage prevails with the convex beveled surface of mirror 130.

As a further exploitation of this concave beveled surface advantage the curvature radius of the concave beveled surface of mirror 116 may be made equal to the distance between the mirror surface and the pivot axis 113 for angular positioning of the laser 112 i.e., the pivot point used by the motor driven screw 202 discussed in connection with the FIG. 2 and FIG. 3 drawings above. In addition it is desirable for the radius of curvature of the concave beveled surface mirror 116 and the convex beveled surface mirror 130 to be of equal magnitudes. Such equal radii are found to provide a degree of compensation for distortions introduced into the beam along path 118 for example as a result of the three dimensional curvature of the mirror 116. Such distortions tend to be offset in the beam from mirror 130 communicating along path 132 to the surveyor's rod 140. This distortion removal mechanisim does not of course preclude a tendency of the beam along path 132 to broaden or expand slightly as discussed above. This tendency is sufficiently small as to be acceptable with moderate values of the distance 152 between apparatus 100 and apparatus 102 in FIG. 1.

FIG. 4 and FIG. 5 in the drawings show additional details of the mirror assembly 108 of the FIG. 1 apparatus 100. FIG. 4 is a larger side view of this mirror assembly 108 and FIG. 5 a bottom view. As may be observed in the FIG. 4 and FIG. 5 drawings the mirror 130 is preferably shielded from sun, rain and physical abuse by an overhanging cap 400 which may be made of plastic or coated metal materials for examples. The cap 400 and reflector mirror 130 are mounted on the second leveling device 404 of the FIG. 1 apparatus which is in turn carried on the tripod 106-supported platform assembly 134. As implied in the FIG. 4 drawing the platform assembly 134 and leveling device 404 include centrodial apertures suitable for communicating the position-determining output beam 114 of the second laser 112 to a receptor and two axis vernier apparatus usable to dispose the mirror 130 directly over the mirror 116. The vernier apparatus is not shown in FIG. 3 or FIG. 4 but may comprise a part of the platform assembly 134, the leveling device 404 or the mirror/sun and rain cap elements shown in FIG. 4 and FIG. 5. The FIG. 3 platform assembly 134, leveling device 404 and mirror/sun and rain cap elements are preferably shaped as shown in FIG. 4 in order to avoid interference with the path 118 of the primary laser 110.

Error Budget Considerations

Notwithstanding the concave-convex beveled surfaces distortion compensation tendency discussed above certain error producing mechanisms do remain possible in the FIG. 1 apparatus. Generally for an instrument of the FIG. 1 type to be usable for the described purposes it should provide overall alignment errors between marker 146 and determined pipeline course 150 that total less than one half milliradian or less than ±0.06 degrees. Another statement of the desired accuracy is that the realized error should be less than one part in ten thousand and preferably less than one part in two thousand.

One of the error mechanisms attending the FIG. 1 apparatus concerns for example the instrument accuracy obtained if the mirrors 116 and 130 are laterally displaced along the left to right horizontal direction in FIG. 1, e.g., the error resulting from imperfect mirror alignment accomplished with the laser 112. If such misalignment occurs it may be appreciated that instrument error will arise because the curvature of the upper mirror 130 will cause the laser beam along path 132 to be deflected at some azimuth angle with respect to its desired location. Generally displacement of mirrors 116 and 130 along the left to right horizontal direction in FIG. 1, when using mirrors of 410 millimeters radius of curvature, results in a beam azimuth error of 2.39 milliradians per millimeter of mirror displacement.

Another error source possible with the FIG. 1 apparatus involves lateral displacement of the mirrors 116 and 130 along the fore and aft or into and out of the page direction in FIG. 1. Generally displacement of mirrors 116 and 130 along this fore and aft horizontal direction in FIG. 1, when using mirrors of 410 millimeters radius of curvature, results in a beam displacement error of 0.125 milliradians per millimeter of mirror displacement.

Additional errors may involve tilting of either the roll or pitch variety in the laser 112 or the mirror assembly 108 in FIG. 1. In this latter case with mirrors of 410 millimeters radius of curvature at 116 and 130 and a mirror separation of three meters (i.e., a depth near two meters for the receptacle 104) pitch error in the laser 112 results in beam deflection along the path 132 of two milliradians per milliradian of laser pitch. Roll tilting of the laser 112 or the mirror assembly 108 in FIG. 1 results in a beam error of 7 milliradians per milliradian of tilt.

Alternate arrangements of the present invention are possible while remaining within the spirit of the invention. These arrangements may include for example a disposition of the mirrors 116 and 130 in a common tube-like member to form a rigid periscope and assure accurate mirror alignment. Additionally the optical reflectors 116 and 130 may be replaced with holographic elements performing similar functions. Such holographic elements may for example have transmissive or reflective characteristics and be disposed to deflect at any desired angle.

The disclosed invention therefore is believed to provide a subterranean course alignment instrument of desirable accuracy, reliability and setup speed capabilities.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Surface-referenced pipeline subterranean azimuth course-determining laser apparatus comprising the combination of:

a first laser element disposed in a subterranean receptacle and generating subterranean receptacle-contained horizontally directed radiant energy emission at an output port thereof;

a desired pipeline azimuth course marker element disposed at a surface reference location distal of said subterranean receptacle;

first curved mirror apparatus selectively coupled to said output port of said first laser element and selectively directing said subterranean receptacle-contained horizontally directed radiant energy emission upward and out of said subterranean receptacle;

second curved mirror apparatus disposed above said subterranean receptacle and said first laser element and orienting said upward and out-directed first laser element radiant energy parallel with said first laser element horizontally directed radiant energy emission away from said subterranean receptacle in an above ground selected azimuth direction toward said desired pipeline course marker element;

said subterranean receptacle-contained first laser element horizontally directed radiant energy emission selectively designating a desired subterranean azimuth course for said pipeline in response to prior optimized receipt of said first laser radiant energy at said desired pipeline course marker surface reference element via said first curved mirror apparatus and said second curved mirror apparatus.

2. The surface-referenced pipeline subterranean azimuth course-determining laser apparatus of claim 1 wherein said pipeline comprises one of a sewer line, a water line, an electro-optic conduit line, a petroleum product line, a ditch and a tunnel.

3. The surface-referenced pipeline subterranean azimuth course-determining laser apparatus of claim 1 wherein said subterranean receptacle comprises an initial earth opening of an elongated trench.

4. The surface-referenced pipeline subterranean azimuth course-determining laser apparatus of claim 1 wherein said pipeline azimuth surface-reference located course marker comprises one of an earth-received marker stake and a surveying rod element.

5. The surface-referenced pipeline subterranean azimuth course-determining laser apparatus of claim 1 wherein said first curved mirror apparatus comprises a concave bevel shape of selected concavity radius.

6. The surface-referenced pipeline subterranean azimuth course-determining laser apparatus of claim 1 wherein said second curved mirror apparatus comprises a convex bevel shape of selected convexity radius.

7. The surface-referenced pipeline subterranean azimuth course-determining laser apparatus of claim 1 further including a second laser element disposed in said subterranean receptacle in connection with said first laser element and generating a first curved mirror apparatus and second curved mirror apparatus alignment-enabling vertically oriented radiant energy signal at an output port thereof.

8. The surface-referenced pipeline subterranean azimuth course-determining laser apparatus of claim 7 wherein said first curved mirror apparatus comprises a concave bevel shape of selected concavity radius, said second curved mirror apparatus comprises a convex bevel shape of selected convexity radius and wherein said second laser element is disposed at a center of curvature point of said first curved mirror apparatus.

9. The surface-referenced pipeline subterranean azimuth course-determining laser apparatus of claim 8 wherein said first curved mirror apparatus concave bevel shape and said second curved mirror apparatus convex bevel shape are of equal curvature radii.

10. The surface-referenced pipeline subterranean azimuth course-determining laser apparatus of claim 1 wherein said first laser element comprises one of a solid state semiconductor laser and a gaseous laser.

11. The surface-referenced pipeline subterranean azimuth course-determining laser apparatus of claim 10 wherein said first laser element comprises a visible spectrum radiant energy-emitting laser.

12. The surface-referenced pipeline subterranean azimuth course-determining laser apparatus of claim 1 wherein said first curved mirror apparatus and said second curved mirror apparatus each include self leveling apparatus, wherein said second curved mirror apparatus is disposed on a tripod-like element and wherein said second curved mirror apparatus also includes a horizontal X-Y plane-disposed second laser element alignment-enabling vernier apparatus.

13. The surface-referenced pipeline subterranean azimuth course-determining laser apparatus of claim 1 wherein said first curved mirror apparatus includes selectively actuatable curved mirror pivot apparatus enabling election of said selectively coupled horizontally directed radiant energy emission and said upward and out of said subterranean receptacle energy emission.

14. The method of aligning a subterranean course-identifying laser azimuth guidance instrument to a pipeline course-determining surface-received course marker, said method comprising the steps of:

disposing said subterranean course-identifying laser azimuth guidance instrument, and a surmounted curving mirror comer reflector member optically communicating therewith, in earth-parallel planes located within and passing above an earthen receptacle;

diverting laser beam output radiant energy from an earthen receptacle wall-illuminating first orientation parallel with said earth-parallel planes in said earthen receptacle to a second orthogonal orientation intercepting an input port of said surmounted curving mirror corner reflector member;

directing said surmounted curving mirror corner reflector member input port radiant energy from an output port of said surmounted curving mirror corner reflector member along an earth-parallel plane toward said course marker;

aligning said subterranean laser azimuth guidance instrument to an azimuth position achieving aligned maximum illumination of said course marker by said surmounted curving mirror corner reflector output port radiant energy;

returning said laser beam output radiant energy to a non-diverted receptacle wall-illuminating orientation determinative of said pipeline course without disturbing said subterranean laser azimuth guidance instrument alignment.

15. The method of aligning a subterranean course-identifying laser azimuth guidance instrument of claim 14 wherein said step of returning said laser beam output radiant energy to a non-diverted receptacle wall-illuminating orientation determinative of said pipeline course includes the step of pivoting a corner mirror disposed in said laser azimuth guidance instrument out of a laser beam-intercepting position.

16. Surface reference marker-guided pipeline subterranean azimuth course-identifying laser instrument apparatus comprising the combination of:

first laser apparatus disposed in an earthen receptacle and generating earthen receptacle-contained horizontal component-inclusive laser energy emission at a laser output port;

a desired pipeline subterranean azimuth course marker element disposed at an earth surface-received location removed from said earthen receptacle;

pivotally mounted concave bevel curved mirror apparatus selectively coupleable to said laser output port and thereby, during a laser instrument apparatus alignment sequence, electively directing said earthen receptacle-contained horizontal component-inclusive laser energy emission in a vertical component-inclusive upward direction out of said earthen receptacle;

convex bevel curved mirror apparatus disposed above said earthen receptacle and said first laser apparatus and orienting said vertical component-inclusive upward direction first laser apparatus radiant energy, during said alignment sequence, away from said earthen receptacle in an above-ground azimuth direction toward said earth surface-received desired pipeline subterranean azimuth course marker element;

alignment adjustment apparatus connected with said earthen receptacle-disposed first laser apparatus and enabling, during said alignment sequence, optimum alignment of said first laser apparatus radiant energy with said earth surface-received desired pipeline subterranean azimuth course marker element;

said earthen receptacle-contained first laser apparatus horizontal component-inclusive radiant energy emission selectively designating, following said alignment sequence, a desired subterranean azimuth course for said pipeline, in response to said optimum alignment of said first laser apparatus radiant energy with said earth surface-received desired pipeline subterranean azimuth course marker element via a pseudo periscope comprised of said concave curved mirror apparatus and said convex curved mirror apparatus.

17. The surface reference marker-guided pipeline subterranean azimuth course-identifying laser instrument apparatus of claim 16 wherein said concave bevel curved mirror apparatus and said convex bevel curved mirror apparatus comprise front surface reflective mirror elements.

18. The surface reference marker-guided pipeline subterranean azimuth course-identifying laser instrument apparatus of claim 16 further including:

self leveling apparatus connected with said concave bevel curved mirror apparatus and said convex bevel curved mirror apparatus;

concave bevel curved mirror and convex bevel curved mirror alignment apparatus inclusive of second laser apparatus, disposed in said first laser apparatus, orthogonal of said horizontal component-inclusive first laser apparatus energy emission.

19. The surface reference marker-guided pipeline subterranean azimuth course-identifying laser instrument apparatus of claim 16 wherein:

said earthen receptacle comprises one of a pipeline terminal earth hole and a pipeline inter terminal earth hole; and said convex bevel curved mirror apparatus comprises a tripod-mounted convex curved mirror element disposed over said earth hole and aligned with a concave curved mirror disposed in said first laser apparatus in one of said earth holes;

said convex curved mirror and said concave curved mirror are of equal curvature radius;

said convex curved mirror and said concave curved mirror are each mounted at a distance equal to said curvature radius from a mirror pivot point.

20. The surface reference marker-guided pipeline subterranean azimuth course-identifying laser instrument apparatus of claim 16 wherein said alignment adjustment apparatus includes orthogonally disposed vernier apparatus, received perpendicular to said vertical component-inclusive upward direction, connected with said convex bevel curved mirror apparatus.

* * * * *